May 18, 1937.  L. LOGAN ET AL  2,080,924

AUTOMATIC TERMINATOR FOR CYCLE CONTROL SYSTEMS

Filed Dec. 19, 1935  2 Sheets-Sheet 1

INVENTORS
LEONARD LOGAN AND
CHARLES WEBBER
BY
ATTORNEY.

May 18, 1937.  L. LOGAN ET AL  2,080,924
AUTOMATIC TERMINATOR FOR CYCLE CONTROL SYSTEMS
Filed Dec. 19, 1935  2 Sheets-Sheet 2

INVENTORS
LEONARD LOGAN AND
CHARLES WEBBER
BY
ATTORNEY.

Patented May 18, 1937

2,080,924

UNITED STATES PATENT OFFICE 2,080,924

AUTOMATIC TERMINATOR FOR CYCLE CONTROL SYSTEMS

Leonard Logan, Flushing, N. Y., and Charles Webber, Hohokus, N. J., assignors to The Bristol Company, Waterbury, Conn., a corporation of Connecticut Application December 19, 1935, Serial No. 55,206

7 Claims. (Cl. 137—145)

The invention relates to automatic process cycle control systems, and more particularly to a device for terminating a cycle at a definite and predetermined time in a normally repetitive sequence of events.

In the automatic control of discontinuous processes, particularly those requiring the repeated operation of a number of valves in a definite and predetermined sequence, it is customary to make use of a so-called "process cycle controller". This apparatus may take the form of a device having a plurality of pilot valves actuated by individual cams driven in a predetermined mutual time relationship, the said pilot valves acting to govern larger valves as of the air-operated type, for example, to initiate and/or maintain a desired condition. A discontinuous process may be repetitive, as in the "flowing" of an oil well, where a definite sequence of events is continuously repeated, or it may be regularly terminated upon the completion of a definite occurrence in the cycle, as in the curing of rubber or the polymerization of phenolic products, the cycle in the latter case being reestablished only by the superposition of external control. In the former case it is customary that the motor or timing element driving the control cams be continuously operated, and that its operation be not subject to any of the elements under control of the cam system. In the latter, the driving of the motor is definitely associated with some event in the cycle, either through a separate cam or by being tied in with the operation of a certain valve or like element in the mechanism.

It is an object of this invention to provide means whereby a normally repetitive process may be terminated by a cycle controller at a point in the cycle corresponding to the completion of a certain element of the cycle, the terminating function being exercised subject to an operation superposed on the operation of the control instrument at a time prior to that at which it is desired for the cycle to be terminated.

In carrying out the invention, provision is made for a pressure-operated electric switch to interrupt the circuit to a motor driving the different cams at a uniform rotational velocity, one of the cams controlling the said switch to terminate the cycle at a predetermined time. In addition, means subject to manual actuation is afforded to render said terminating switch means inoperative.

The nature of the invention, however, will best be understood when described in connection with the accompanying drawings, in which.

Figure 1:
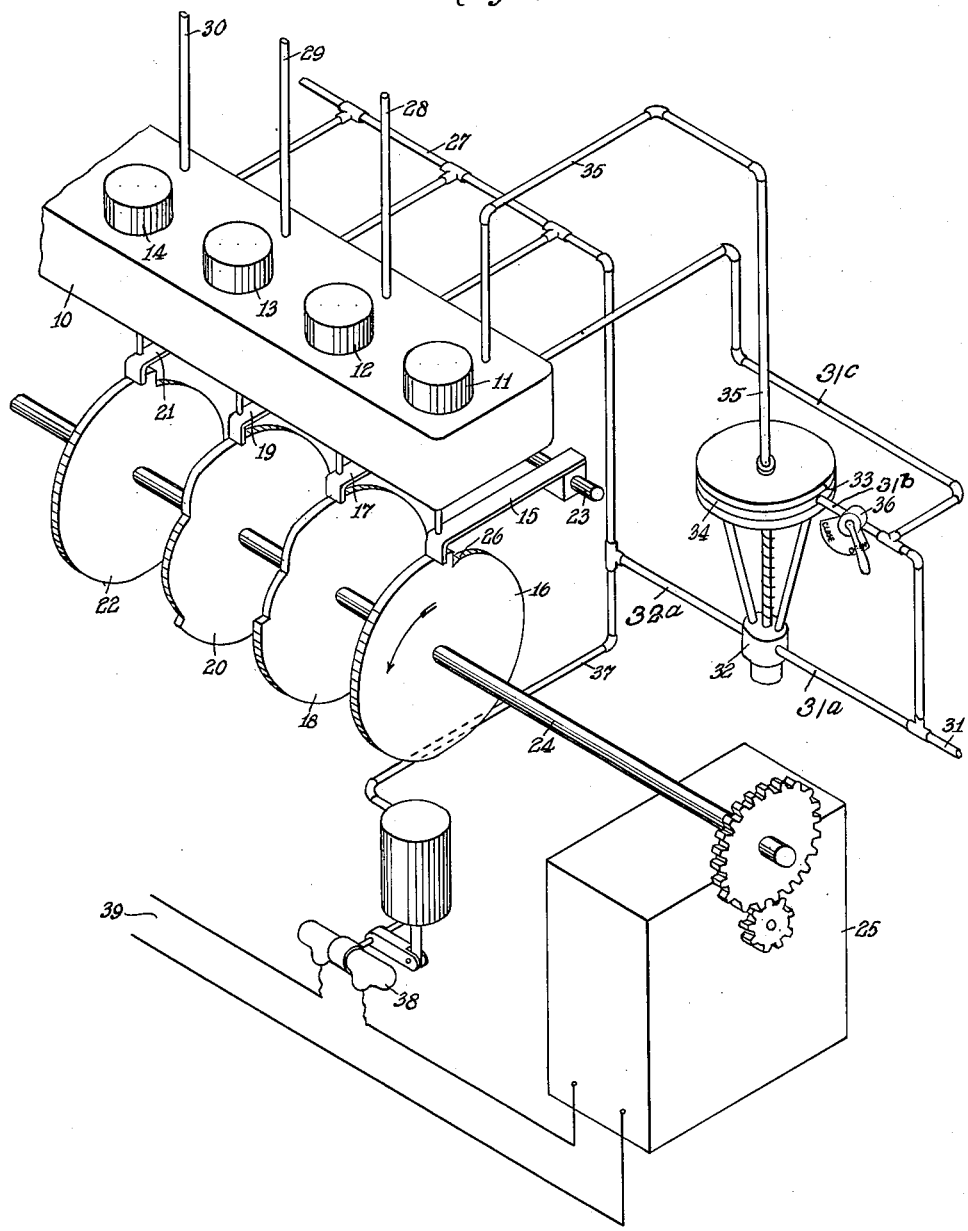
Fig. 1 is a perspective view of a portion of a cycle control installation embodying one form of the invention.

Referring to the drawings, 10 designates a mounting block of a well-known form of pneumatic process-cycle controller, having mounted thereon a plurality of pilot valves 11, 12, 13, and 14, preferably of the type set forth in U. S. Letters Patent #1,890,494, granted September 9, 1931, to Perry A. Borden. Each of these valves is subject to independent actuation by respective individual cam members, through a corresponding follower element—valve 11 through a follower 15, resting on the periphery of a cam 16; valve 12 through a follower 17, from a cam 18; valve 13 through a follower 19, from a cam 20; and valve 14 through a follower 21, from a cam 22.

The several followers are free for independent rotation through a limited angle about a shaft 23; and the several cams are adjustably fixed to a shaft 24 for continuous rotation as a unit in the direction indicated by the arrow, being driven at a uniform angular velocity by a constant speed electric motor 25.

The cam 16 has upon its periphery a single indentation 26, occupying only a small part of the circumference, so that the follower 15 is normally held to its highest position as the cycle proceeds, maintaining the valve 11 in its open position. The remaining cams have their contours formed in a manner that, as their respective followers rise and fall with changes in cam radius, the corresponding pilot valves will be actuated in a predetermined sequence and in a manner to effect the various events required in the carrying out of the process cycle.

The pilot valves 12, 13, and 14 receive a control fluid such as air from a common manifold 27, and govern the admission or exhaust of air in conduits 28, 29, and 30, leading to various pneumatically actuated devices forming elements in the system under control. It will be understood that the pilot valve system, cam system, etc., may be extended (toward the left in the diagram) to govern a large number of mutually independent events which it is desired to carry out in a definite sequence. The pilot valve 11 receives control air directly from a source of supply 31 through the pipe 31a.

Figure 3:
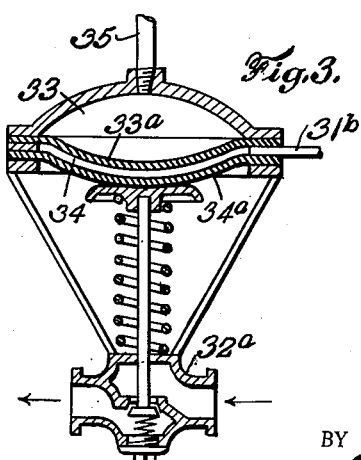
Fig. 3 is a fragmentary vertical section of the reverse-acting valve utilized in connection with the embodiment illustrated in Fig. 1.

A reverse-acting double-diaphragm valve 32, shown in detail in Fig. 3, controls the admission of air from the supply 31 through the pipe 31b to the manifold 27. The operating head of this valve contains two diaphragms 33a and 34a, which, with the metal top of the valve, form working spaces 33 and 34, non-communicating, but jointly actuating the valve stem in a sense that when air pressure is applied to either or both of the diaphragm spaces the valve will be maintained in an open position. This will place manifold 27 in direct communication through the connections 31a and 32a, respectively, to and from the valve 32, with the supply 31, and air will be cut off from the manifold only upon pressure being relieved in both the spaces 33 and 34.

The space 33 receives its air supply through a conduit 35 and under control from the pilot valve 11 connected to the source 31 through pipe 31c, so that when the stem of this valve is lifted, by the follower 15 resting upon the greater radius of the cam 16, the corresponding diaphragm will be actuated, tending to maintain the valve 32 in an open position. The diaphragm space 34 is supplied with air from the source 31 through a stop-cock 36 and pipe 31b, which may be manually set in an open or a closed position. With the cock open as shown, fluid under the supply pressure is admitted to the space 34, maintaining the valve 32 open without regard to whether or not there be air pressure in the space 33. With the stop-cock closed, the valve 32 will be maintained open only so long as air is admitted to the space 33 through the pilot valve 11.

A conduit 37, directly communicating with the manifold 27, supplies control air to a pressure-actuated electric switch 38, so arranged that with pressure applied a circuit is completed between the motor 25 and a source of electric supply 39, causing the motor to operate; and with pressure relieved, the circuit is opened, to bring the motor to rest.

In the normal operation of a cycle, the stop-cock 36 is set in the open position, so that the valve 32 is maintained open by air pressure in the space 34, admitting control air to the manifold 27 and to pressure switch 38, causing the motor 25 to operate. This will effect the driving of shaft 24 and the cams carried thereby, so that the various events constituting the controlled cycle will be carried out in prearranged order. When the valve 11 is opened by its cam 16, air pressure will be applied to the space 33, and as the follower 15 enters the indentation 26 of said cam the valve 11 will be closed, relieving pressure in the space 33.

With the stop-cock 36 open, however, the air in space 34 will prevent the valve 32 closing; and so long as this valve is open the cycle controller will continue to operate, repeating its cycle indefinitely.

In order to cause the cycle to be terminated at a prearranged future time corresponding to the position of the indentation 26 on cam 16, it is necessary only to turn the stop-cock 36 to its closed position, which shuts off the air supply from the space 34 of the valve 32. This valve will then become dependent solely upon air pressure in the space 33 to hold it open. So long as the pilot valve 11 is held open by the cam 16, air pressure in the space 33 will maintain valve 32 open. As the indentation 26 passes beneath the follower 15, the valve 11 will be closed, relieving air pressure in the space 33. The valve 32, thus having no air pressure in either diaphragm space, will close, shutting off the air supply from manifold 27 and from the pressure switch 38, and thereby causing all devices controlled through the several pilot valves to assume an inert position and the motor 25 to come to rest, thus terminating the cycle at a predetermined and definite point.

Figure 2:
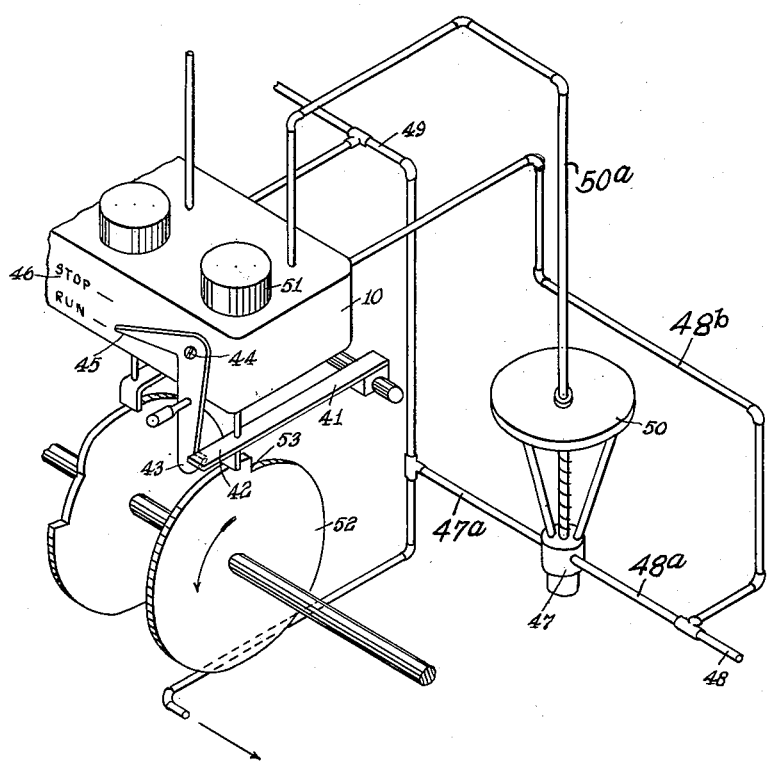
Fig. 2 is a perspective view of an alternative form of an installation embodying the invention.

In Fig. 2 is shown an alternative arrangement, in which, by a mechanical modification of the control instrument, the need for a double-diaphragm valve is obviated. The pilot valves, cams, cam-followers and associated parts are identical with those set forth in Fig. 1. The follower 15 of Fig. 1, however, is replaced by a follower 41, similar to follower 15, but having a forward projection 42 extending slightly to the front of the mounting block 10. A latch 43, pivotally mounted, as by a screw 44, upon the block 10, is adapted to be moved into and out of engagement with the extension 42 of the follower 41.

An index 45 on the latch member provides in its relation to fixed indicia 46 carried by the block 10 an indication of the position of the latch. This index may be marked, for example, "run" when the latch is engaging the extension 42 to support the follower independently of the cam 16, and "stop" when the latch is in a position of disengagement with the follower. The valve 32 of Fig. 1 is replaced by a single-diaphragm reverse-acting valve 47 connected in the line between the source 48 and the manifold 49, as through pipes 48a and 47a, respectively, to and from the valve, said valve having its single diaphragm space 50 supplied with air through the pilot valve 51 and connection 50a, the control fluid being supplied through a pipe connection 48b from the source 48.

Under conditions of continuous operation, the latch 43 is set in the "run" position, the follower 41 thus being suspended independently of cam 16, and the pilot valve is held open keeping air pressure on the diaphragm of valve 47 and maintaining in the manifold 49 and on the pressure switch (not shown) the air pressure necessary to continue the cycle. In order to cause the cycle to be automatically terminated at a predetermined future time, the latch 43 is set to the "stop" position, when the follower 41 is dependent solely on the cam 52 for support, so that as the indentation 53 passes beneath the follower 42 the latter will drop to the smaller radius of the cam, closing the pilot valve 51. This relieves pressure in the diaphragm valve 47, which assumes a closed position, thus terminating the cycle as hereinbefore set forth in connection with the description of the embodiment shown in Fig. 1 of the drawings.

We claim:

1. In a repetitive process cycle controller system including a plurality of pilot valves adapted to govern the supply of fluid to cycle-operating devices: the combination with a plurality of cams adapted to actuate said valves, and motor means to drive said cams at a uniform velocity; of means subject to actuation by one of said cams adapted to terminate said cycle at a predetermined time, and means subject to manual actuation during and prior to completion of said cycle to render said terminating means inoperative.

2. In a repetitive process cycle controller system including a plurality of pilot valves adapted to govern the supply of fluid to cycle operating devices: the combination with a plurality of cams adapted to actuate said valves, motor means to drive said cams at a uniform velocity, a fluid-pressure-operated switch included in the circuit of said motor, and a source of fluid supply for said pilot valves and fluid-pressure-operated switch; of means subject to one of said cams for interrupting said source of fluid supply at a predetermined time, and means subject to manual actuation to render said interrupting means inoperative.

3. In a repetitive process cycle controller system including a plurality of pilot valves adapted to govern the supply of fluid to cycle operating devices: the combination with a plurality of cams adapted to actuate said valves, motor means to drive said cams at a uniform velocity, a fluid-pressure-operated switch included in the circuit of said motor, a main source of fluid supply for one of said pilot valves, a conduit for supplying the fluid to another of said pilot valves and the pressure-operated switch; of valve means adapted to provide communication between said main source of fluid supply and said conduit, and subject to control by said one pilot valve, means controlled by one of said cams to actuate said one pilot valve in a sense to close said valve means, and movable means for rendering said pilot-valve-actuated valve means inoperative.

4. In a repetitive process cycle controller system including a plurality of pilot valves adapted to govern the supply of fluid to cycle operating devices: the combination with a plurality of cams adapted to actuate said valves, motor means to drive said cams at a uniform velocity, a fluid-pressure-operated switch included in the circuit of said motor, a main source of fluid supply for one of said pilot valves, a conduit for supplying the fluid to another of said pilot valves and the pressure-operated switch; of valve means adapted to provide communication between said main source of fluid supply and said conduit, and subject to control by said one pilot valve, means controlled by one of said cams to actuate said one pilot valve in a sense to close said valve means, movable means for rendering said pilot-valve-actuated valve means inoperative, and means to provide an indication of the position of said movable means.

5. In a repetitive process cycle controller system including a plurality of pilot valves adapted to govern the supply of an expansible fluid to cycle-operating devices: the combination with a plurality of cam members operatively engaging the respective pilot valves to actuate the same in a definite and predetermined sequence, and an electric motor to drive said cams at a uniform velocity, a fluid-pressure-operated switch in circuit with said motor, a main source of expansible fluid supply for one of said pilot valves, and a conduit for supplying the fluid to another of said pilot valves and the fluid-pressure-operated switch and connected to the main source of expansible fluid supply; of valve means interposed between said conduit and the said source of supply and embodying two pressure-responsive members controlling the opening and closing of said valve means, one of said responsive members being actuated from said main source of supply through the one of said pilot valves, and manually actuated means for actuating the other of said responsive members in controlling the supply of fluid thereto from said main source of fluid supply.

6. In a repetitive process cycle controller system including a plurality of pilot valves adapted to govern the supply of an expansible fluid to cycle-operating devices: the combination with a plurality of cam members operatively engaging the respective pilot valves to actuate the same in a definite and predetermined sequence, and an electric motor to drive said cams at a uniform velocity, a fluid-pressure-operated switch in circuit with said motor, a main source of expansible fluid supply for one of said pilot valves, and a conduit for supplying the fluid to another of said pilot valves and the fluid-pressure-operated switch and connected to the main source of expansible fluid supply; of valve means interposed between said conduit and the said source of fluid supply and subject to operation through the one of said pilot valves, and means maintaining said one pilot valve in an open position independently of the cam means by which it is normally actuated.

7. In a repetitive process cycle controller system including a plurality of pilot valves adapted to govern the supply of an expansible fluid to cycle-operating devices: the combination with a plurality of cam members operatively engaging the respective pilot valves to actuate the same in a definite and predetermined sequence, and an electric motor to drive said cams at a uniform velocity, a fluid-pressure-operated switch in circuit with said motor, a main source of expansible fluid supply for one of said pilot valves, and a conduit for supplying the fluid to another of said pilot valves and the fluid-pressure-operated switch and connected to the main source of expansible fluid supply; of valve means interposed between said conduit and the said source of fluid supply and subject to operation through the one of said pilot valves, and manual means for disengaging said one pilot valve from its cam means.

LEONARD LOGAN.
CHARLES WEBBER.